Jan. 20, 1931.  R. PUDELKO  1,789,685
MAXIMUM ENERGY DEMAND INDICATOR WITH SIGNALING DEVICE
Filed Oct. 12, 1923
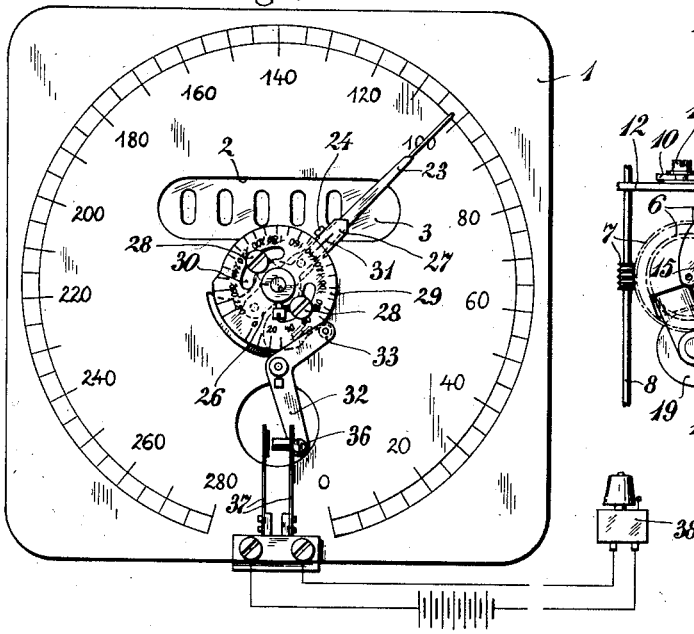
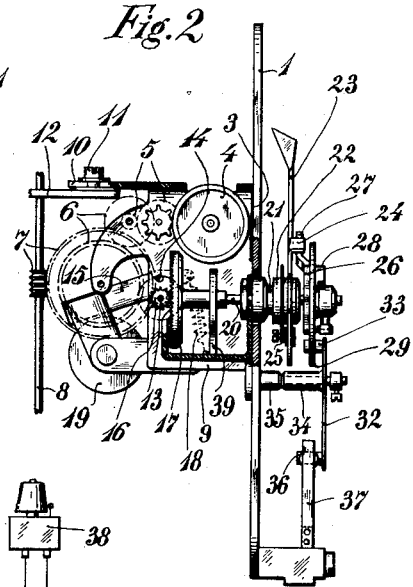
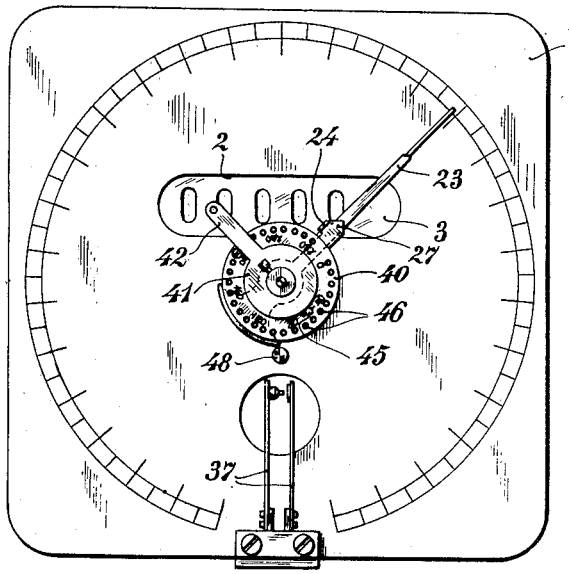
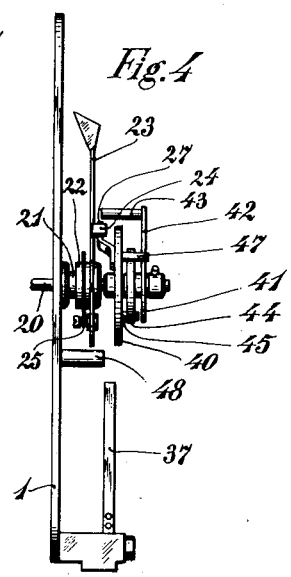
Inventor:
Riccard Pudelko
by P. Singer atty Patented Jan. 20, 1931

1,789,685

UNITED STATES PATENT OFFICE

RICCARD PUDELKO, OF ZUG, SWITZERLAND, ASSIGNOR TO THE FIRM LANDIS & GYR. A. G., OF ZUG, SWITZERLAND

MAXIMUM-ENERGY-DEMAND INDICATOR WITH SIGNALING DEVICE

Application filed October 12, 1923, Serial No. 668,199, and in Switzerland, October 31, 1922.

In the maximum energy demand indicators used up to now especially in those used in combination with electricity meters on a fluctuating load the dial records the maximum consumption consumed in a certain period of time and whatever the instantaneous load, only the maximum averaged over said given time interval is registered. By the reading of said maximum demand indicators the consumer can determine at any time whether the consumption exceeds the limit set by the supply station. It being practically impossible for any consumer to watch the dial continuously if it happens that the consumption exceeds the maximum set and extra charges etc. have to be paid by the consumer.

The object of the present invention is to provide means to obviate said extra expenses and this object is attained by an adjustable signaling device co-operating with the maximum demand indicator which signaling device comes into action as soon as the load exceeds a predetermined limit.

In the accompanying drawings two forms of the device are shown by way of examples.

Fig. 1 shows a first form of the device in front elevation and

Fig. 2 is a side elevation thereof, seen from the left hand side.

Fig. 3 illustrates the second example in front elevation.

Fig. 4 is a side elevation seen from the left hand side.

The device shown in Figs. 1 and 2 comprises a dial 1 having a window 2 covered by a sheet metal plate 3. Said plate 3 is provided with holes through which the number discs of the counter are visible. The counter or usual registering mechanism of the meter is driven by a gearing 5, 6 and 7 from the spindle 8 of the electricity meter these constituting the usual connections from the meter disc spindle to the registering mechanism, and may be of any desired form so far as concerns the present invention.

Referring now to the embodied form of the present invention which cooperates with the meter mechanism just described, the dial 1 is fastened to the frame 9 of the electricity meter, and the integrating counter is fixed by screws 11 and a prolongation 10 to a bracket 12 of the frame of the meter. The meter comprises a shaft 13 journalled in a lever 15 rotatably mounted on a bolt 14 of the meter frame. On the shaft 13 a spur wheel 16 is arranged engaging a toothed gear 17 said wheel 16 being coupled with the shaft 13 by some friction clutch. The lever 15 is connected with the frame by a spring 18 and is provided with an armature co-operating with an electromagnet 19. Thus the pinion or spur wheel 16 is held in mesh with crown-gear 17 by magnet 19, when energized, against spring 18, but when magnet 19 is deenergized spring 18 rocks lever 15 to move pinion 16 out of mesh with crown-gear 17. During the disengagement of pinion 16 and crown gear 17, a spring 39 restores the maximum demand mechanism to initial position as will be later described.

The gear 17 is fixed to shaft 20 rotatably mounted within a sleeve 21 firmly connected with the frame. The boss 22 of the hand 23 is free to rotate on the sleeve 21. The hand 23 is provided with a lug 24 and is held in position by a spring 25 fixed to the hand 23 and having two springy shanks passing through slots in said boss 22 and bearing against the sleeve 21 with sufficient pressure to retain the hand in any position by friction. The hand 23 cooperates with the scale on dial 1 to indicate one of the energy measurements marked on the dial, as shown in Fig. 1.

Means are provided for moving the hand 23 forwardly during the metering in any of the successive predetermined (and usually equal) time periods, said means being varying settable to operate at any predetermined integrated maximum of energy consumption within the usual or other convenient limits. Said means is also restored to zero or other initial position at the ends of the successive predetermined time periods, the hand 23, however, not being returned therewith. As embodied, on the spindle 20 is fastened a four-armed piece 26 carrying a pointer 27 adapted to engage with lug 24 on hand 23. To said piece 26 a cam 29 is fastened by means of two set-screws 28. The cam 29 comprises a peripheral cam portion having a larger diameter, than the remaining part, this cam 26 operating to close the switch 37 of the controlled circuit.

In the embodied form of means which is variably positionable in order to indicate and to operate at a selected maximum demand or consumption of energy, the cam 29 is provided with a scale corresponding to that on the dial 1 and with two curved slots 30 through which the said screws 28 pass. The cam 29 may be set in any position with reference to the mark 31 and thus in any desired position with respect to the driving connections to the meter spindle so that the device will operate at the desired set maximum demand.

In the embodied form of circuit-controlling mechanism, on the periphery of the cam 29 bears a pin 33 fixed to one arm of a double armed lever 32 mounted by means of a boss 34 on a bolt 35 provided on the dial 1. The said lever 32 is provided with a second pin 36 of insulating material which pin 36 works in conjunction with a switch 37. Said switch 37 controls a circuit comprising an electric signaling device, as for instance an electric bell 38.

If the hand 23 is in its zero or other initial position, that is, above the number 0 of the scale on dial 1, the pointer 27 is pressed by a spiral spring 39 against the boss 34 which serves as a stop and the pin 33 rests on that portion of cam 29 having the smaller diameter, the switch 37 and hence the signaling circuit being open. The said spring 39 is fixed with one end to the meter frame and with the other to the gear 17. If during a registration period the spindle 20 is rotated by the counting train of the electricity meter, the pointer 27 engages the lug 24 of the hand 23 setting the same according to the amount of energy consumed in the given time interval. If a predetermined maximum consumption is exceeded the pin 33 passes on to that portion of the cam 29 having the larger diameter. The lever 32 turns on its pin and the pin 36 closes the switch 37 closing thereby the signaling circuit. The signal, for instance a bell 38, is kept ringing to draw attention to the fact that the permissible maximum consumption is being exceeded.

Generally it will be of advantage to set the cam 29 in such a manner that the bell starts to ring shortly before the maximum consumption allowed by the supply authorities is attained to give the consumer a chance to prevent the limit being exceeded.

The cam 29 may be formed and set to any desired duration of signal. In the device shown in Figs. 1 and 2, the cam portion having the larger diameter extends over 1/4 of the circumference. The hand 23 would have to turn through about 90° before the signal once started would be stopped, that is, the limit would have to be overstepped very largely, until the signal is stopped. The duration of the alarm can be varied by varying the length of the cam portion with the larger diameter.

The operation of the hereinbefore-described mechanism during one of the predetermined time periods is substantially as follows:

At the beginning of the predetermined time period, the magnet 19 is energized, and lever 15 is swung on its pivot 14 against the action of spring 18, thereby bringing pinion 16 into mesh with crown-gear 17, the mechanism then running in proper relation with the meter-spindle 8 during the time period. Shaft 20 rotates with crown-gear 17 and arm 27 moves therewith, in the counter-clockwise direction in Fig. 1, the restoring spring 39 being wound as the mechanism operates. The cam 29 has been set, by means of the screws 28, to bring the desired maximum amount reading in register with the mark 31 on arm 27, this also positioning the high part of the cam 29 properly with respect to the circuit-closing device 32. If the hand 23 is in the path of the pointer 27 before the maximum predetermined consumption of energy is reached, the hand will be swept forward with the arm or pointer 27, thereby indicating the amount of energy consumed during the time period. When the maximum consumption of energy has been reached (or just prior thereto if desired) the switch operating lever 32 closes the circuit 37, and operates the signal 38 or other device controlled by the circuit. At the end of the predetermined time period the magnet 19 is momentarily deenergized, and spring 18 rocks lever 15 about its pivot 14, and pinion 16 is disengaged from crown-gear 17, and spring 39 returns the mechanism to initial position, with the arm 27 at rest against the boss 34. Magnet 19 is again energized and the operation begins as before.

The device could be constructed in such a manner that the circuit is kept closed until the end of the registration or recording period, that is, during that interval of time when the hand starting from zero passes over the predetermined maximum mark until on its way to zero it again passes the said spot.

A device adapted to work in said manner is illustrated in Fig. 2.

In the device shown in Figs. 3 and 4 the parts designated with like numerals have the same shape and function as the corresponding parts in the device shown in Figs.

1 and 2. The pointer 27 is fastened to a circular disc 40 which is rigidly attached on the spindle 20. A disc 41 loosely mounted on the spindle 20 is provided with an arm 42 carries a pin 43, which pin 43 works in conjunction with the switch 37 of the signaling circuit. On the boss of the disc 41 is arranged a torsion spring 44, one end of which is fixed to said boss of disc 41 and the other end is fastened to a pin 45 of the circular disc 40. In the disc 40 is arranged a circular row of holes 46, corresponding to the divisions of the scale 1, these holes 46 being tapped and adapted to receive a pin 47 working in conjunction with the said arm 42. The pointer 27 in its zero-position rests on a fixed pin 48 and in said position of pointer 27 the arm 42 rests on said pin 47. If spindle 20 is rotated by the counting train of the electricity meter, the spring 44 keeps arm 42 resting on the pin 47. The arm 42 takes part in the rotation of the pointer 27 and of the disc 40. As soon as the consumption attains the maximum which is marked by the position of the pin 47 in the row of holes 46, the pin 43 actuates the switch 37 and closes the signaling circuit and the signal is given. If spindle 20 rotates further in the same direction, that is when the consumption exceeds the maximum allowed, the arm 42 is arrested by the switch 37 whilst the pin 47 and disc 40 rotate still further and thereby tighten the spring 44. When the circular disc 40 returns to its zero position the pin 47 takes the arm 42 with it and opens the switch as soon as the pointer 27 passes the maximum mark.

Instead of an acoustic signal, as in the case of the bell described in the foregoing examples, other kinds of signal devices might be employed, as for instance an optical signal device controlled by the switch.

Means might also be provided, especially in the case of optical signals, for operating the signal device mechanically.

What I wish to secure by U. S. Letters Patent is:

1. In a maximum demand indicator having a hand for use with electric meters, the combination with means adapted to be set according to the maximum consumption, of a scale, a pointer, adapted to advance the hand of the maximum demand indicator, means mounted on the pointer for operating a switch in the circuit of an electrical signal device and means causing the recurrent operation of the mechanism.

2. In a maximum demand indicator having a hand for use with electric meters, the combination with means adapted to be set according to the maximum consumption, of a scale, a pointer adapted to advance the hand of the maximum demand indicator, a cam disc rotated with said pointer, the periphery of said cam being formed by two circles of different radius, said disc being adjustably attached to the pointer and adapted to move and close a switch in a signal circuit and keep said switch closed until said maximum demand indicator is reset, and means for causing the recurrent operation of said mechanism.

3. The combination with a maximum integrated demand indicator, of a mechanism including a member travelling proportionately to the integrated demand during a predetermined period, a circuit controlling device controlled by said member substantially when the maximum demand is reached and means for resetting said member at the end of the predetermined period.

4. In combination with a maximum integrated demand indicator, a mechanism including a member travelling proportionately to the integrated demand during the predetermined period, a circuit controlling device operated by said member approximately when the maximum demand is reached and means operating automatically to reset said member at the end of the predetermined period.

5. In combination with a maximum demand indicator, a mechanism including a member travelling proportionately to the demand during the predetermined period, a circuit controlling device operated by said member approximately when the maximum demand is reached and electro-magnetically operated means for resetting said member at the end of the predetermined period.

6. In combination in a maximum demand meter comprising a meter disc spindle, a member driven from the meter disc proportionately to the energy consumption, a circuit controlling device operated by said member when a predetermined amount of energy has been metered, and means for disconnecting said member from its drive.

7. In combination in a maximum demand meter, a meter disc spindle, a member driven from the meter disc proportionately to the energy consumption, a circuit controlling device operated by said member when a predetermined amount of energy has been metered, means for disconnecting said member from its drive and returning it to initial position at the end of a predetermined time period and means for again connecting said member to the meter disc spindle at the beginning of the next time period.

8. In combination with a maximum demand indicator a mechanism including a member travelling proportionately to the demand during the predetermined period, a circuit controlling device operated by said member and variably positionable with respect thereto for indicating the approach of said member to a predetermined setting and means for resetting said member at the end of a predetermined period.

9. In combination with a maximum demand indicator a mechanism including a member travelling proportionately to the demand during the predetermined period, a circuit controlling device operated by said member and means variably positionable with respect to the member for operating the circuit controlling device when a predetermined part of the maximum demand has been metered.

In witness whereof I affix my signature.
RICCARD PUDELKO.